US012623635B1

(12) United States Patent
Shen

(10) Patent No.: US 12,623,635 B1
(45) Date of Patent: May 12, 2026

(54) VEHICLE STEP STABILIZER

(71) Applicant: Hangzhou zexing Import & Export trading co., ltd, Hangzhou (CN)

(72) Inventor: YangLian Shen, Hangzhou (CN)

(73) Assignee: Hangzhou zexing Import & Export trading co., ltd, Hangzhou (CN)

( * ) Notice: Subject to any disclaimer, the term of this patent is extended or adjusted under 35 U.S.C. 154(b) by 0 days.

(21) Appl. No.: 19/365,533

(22) Filed: Oct. 22, 2025

(51) Int. Cl.
| | |
|---|---|
| B60S 9/06 | (2006.01) |
| B66F 7/06 | (2006.01) |
| B66F 7/28 | (2006.01) |

(52) U.S. Cl.
CPC .............. B60S 9/06 (2013.01); B66F 7/0608 (2013.01); B66F 7/065 (2013.01); B66F 7/28 (2013.01)

(58) Field of Classification Search
CPC ...... B66F 3/08; B66F 3/12; B66F 3/18; B66F 7/065; E02F 9/085; B60S 9/06; B66C 23/78; B60D 1/66
See application file for complete search history.

(56) References Cited

U.S. PATENT DOCUMENTS

| | | | | | |
|---|---|---|---|---|---|
| 296,268 | A | * | 4/1884 | Beal .......................... | B60S 9/06 |
| | | | | | 254/424 |
| 900,237 | A | * | 10/1908 | Trent ...................... | B66F 7/065 |
| | | | | | 187/269 |
| 3,823,915 | A | * | 7/1974 | Koehler ................. | B66F 7/065 |
| | | | | | 254/122 |

| | | | | | |
|---|---|---|---|---|---|
| 4,180,252 | A | * | 12/1979 | Cushenbery ......... | B23Q 1/5468 |
| | | | | | 254/9 B |
| 4,405,116 | A | * | 9/1983 | Eisenberg ............... | B66F 7/065 |
| | | | | | 187/269 |
| 4,969,793 | A | * | 11/1990 | Pawl ...................... | B62D 43/10 |
| | | | | | 414/641 |
| 5,072,955 | A | * | 12/1991 | Holland ................... | B25H 1/16 |
| | | | | | 182/116 |
| 7,093,691 | B1 | * | 8/2006 | Vaughan ............... | B66B 9/0815 |
| | | | | | 187/244 |
| 7,552,616 | B2 | * | 6/2009 | Liu ......................... | G01M 7/08 |
| | | | | | 254/122 |
| 8,567,763 | B1 | * | 10/2013 | Nolan ...................... | B66F 7/28 |
| | | | | | 254/122 |
| 9,227,822 | B2 | * | 1/2016 | Horne .................... | A61G 15/02 |

(Continued)

FOREIGN PATENT DOCUMENTS

| | | | | | |
|---|---|---|---|---|---|
| CN | 112919366 | A | * | 6/2021 | ................ B66F 7/12 |
| CN | 116281725 | A | * | 6/2023 | .............. B66F 7/065 |

(Continued)

*Primary Examiner* — Emma K Frick
(74) *Attorney, Agent, or Firm* — Hemisphere Law, PLLC

(57) ABSTRACT

A vehicle step stabilizer is provided. The vehicle step stabilizer includes two rotatably connected supporting rods connected to a last section of a vehicle, a bidirectional screw having two thread directions at two ends of the bidirectional-screw, a first sliding block and a second sliding block respectively threadedly connected to the two ends of the bidirectional screw. The two supporting rods are rotatably connected to the first sliding block and the second sliding block respectively. The first sliding block and the second sliding block move toward or away from each other on the bidirectional screw, moving tops of the two supporting rods closer or farther apart accordingly to achieve the effect of convenient adjustment and stepless adjustment.

8 Claims, 6 Drawing Sheets

(56)          References Cited

U.S. PATENT DOCUMENTS

| | | | | |
|---|---|---|---|---|
| 9,808,080 | B2 * | 11/2017 | Chung | A47B 3/02 |
| 10,544,019 | B2 * | 1/2020 | Kochie | B66F 7/065 |
| 11,696,638 | B2 * | 7/2023 | James | A47B 9/16 |
| | | | | 108/147.22 |
| 11,964,638 | B2 * | 4/2024 | Fairchild | B60R 16/023 |
| 12,049,395 | B2 * | 7/2024 | Castronuovo | F16G 13/20 |

FOREIGN PATENT DOCUMENTS

| | | | | | |
|---|---|---|---|---|---|
| CN | 117638698 | A | * | 3/2024 | H02B 3/00 |
| FR | 3145527 | A1 | * | 8/2024 | B60S 9/06 |

* cited by examiner

VEHICLE STEP STABILIZER

TECHNICAL FIELD

The disclosure relates to the field of vehicle step supporting technologies, and more particularly to a vehicle step stabilizer.

BACKGROUND

A Chinese patent with an authorization announcement number of CN118618202 B discloses a hidden folding step of a recreational vehicle (RV). The step is deployed from a vehicle body of the RV for use, which inevitably leads to the lack of support for a last pedal of the step.

In a related art, there is a support structure including two hinged supporting rods fixed on the last pedal. The supporting rods are designed as telescopic structures. The two supporting rods are in the splayed shape when the support structure is used, and lengths of the supporting rods are adjusted through extending or retracting the supporting rods to achieve support the last pedal.

However, it is relatively inconvenient to adjust an angle between the supporting rods of the related art above manually. If the supporting rods need to be extended after a user steps on the last pedal, the user must get off from the last pedal and readjust the supporting rods, which is inconvenient and does not allow for stepless adjustment.

SUMMARY

An objective of the disclosure is to provide a vehicle step stabilizer to solve technical problems of inconvenient operation, a large volume after storage, a long and wide size and inability to achieve stepless adjustment.

In order to achieve the above objective, the disclosure provides the following technical solutions.

A vehicle step stabilizer includes two supporting rods rotatably connected to each other and configured for connecting to a last pedal of a vehicle, a bidirectional screw having two thread directions at two ends of the bidirectional screw, a first sliding block and a second sliding block respectively threadedly connected to the two ends of the bidirectional screw. The two supporting rods are rotatably connected to the first sliding block and the second sliding block, respectively. The first sliding block and the second sliding block are configured to move toward or away from each other on the bidirectional screw, thereby moving tops of the two supporting rods closer together or farther apart accordingly.

In an embodiment, the vehicle step stabilizer includes a fixing plate configured for fixing on the last pedal of the vehicle and two connecting plates vertically fixed on two sides of the fixing plate respectively. Each of the first sliding block and the second sliding block is slidably connected to the two connecting plates.

In an embodiment, a first sliding shaft extends outward from two opposite sides of the first sliding block, and a second sliding shaft extends outward from two opposite sides of the second sliding block. Each of the two connecting plates is defined with a first sliding groove and a second sliding groove for sliding operations of the first sliding shaft and the second sliding shaft respectively; and the two supporting rods are rotatably connected to the first sliding shaft and the second sliding shaft, respectively.

In an embodiment, a first balance rod extends outward from the two opposite sides of the first sliding block, a second balance rod extends outward from the two opposite sides of the second sliding block. The two connecting plates define two balance grooves corresponding to the first balance rod and the second balance rod, the first and second balance rods are slidably respectively engaged within the two balance grooves, and the two balance grooves are disposed parallel to the first sliding groove and the second sliding groove.

In an embodiment, a bottom surface of the fixing plate is provided with a limiting member for limiting horizontal displacement of the bidirectional screw.

In an embodiment, the limiting member includes a securing plate vertically fixed on the bottom surface of the fixing plate. The securing plate is rotatably connected to a demarcation point of the two ends of the bidirectional screw. The bidirectional screw defines a limiting groove used to limit the horizontal displacement of the bidirectional screw in cooperation with the securing plate.

In an embodiment, a drive head is fixed to an end of the bidirectional screw, and is configured for driving the rotation of the bidirectional screw.

In an embodiment, the two supporting rods are a first supporting rod and a second supporting rod. A rotating member is disposed at an intersection point of the two supporting rods. A side of the rotating member near the first supporting rod is rotatably connected to an end of a first reinforcing rod. Another end of the first reinforcing rod is rotatably connected to the second sliding block. A side of the second supporting rod is rotatably connected to an end of a second reinforcing rod, and another end of the second reinforcing rod is rotatably connected to the first sliding block.

The first and second reinforcing rods provide enhanced support to the two supporting rods, and improving force distribution, balancing a non-coplanar issue of the two supporting rods caused by thicknesses of the supporting rods when they cross.

In an embodiment, a bottom end of each of the first supporting rod and the second supporting rod is hinged with an extension rod. An outer side of the extension rod is provided with a limiting structure for limiting the excessive rotation of the extension rod. The limiting structure is configured to prevent the extension rod from rotating outward beyond a preset position. Each extension rod has a storage space for accommodating a corresponding one of the first and second supporting rods.

In an embodiment, the fixing plate defines a connecting groove. A connecting chamber is disposed on the fixing plate and disposed at a bottom of a connecting groove. A flange nut is disposed in the connecting chamber. A width of the connecting chamber is larger than a diameter of an inscribed circle of a hexagonal portion of the flange nut, and smaller than a diameter of a circumscribed circle of the hexagon of the flange nut.

In summary, compared with the related art, the disclosure has at least the following beneficial effects.

1. The vehicle step stabilizer can realize the stepless adjustment of the tops of the two supporting rods closer together or farther apart by the rotation of the bidirectional screw, facilitating rapid and repeated adjustments.

2. The extension rod is set to be stored conveniently through folding on the one hand. On the other hand, the extension rod enables a wider range of support angles while maintaining convenient storage.

3. The first and second reinforcing rods provides enhanced support to the two supporting rods, and improving force distribution, balancing the non-coplanar issue of the two supporting rods caused by the thickness of the supporting rods when they cross.

4. The flange nut makes the connection between the vehicle step and the vehicle step stabilizer more convenient. The flange nut has an effect of increasing the friction force, and the flange nut can only slide in the connecting chamber and cannot rotate. It is convenient to adjust and facilitate the installation of the vehicle step stabilizer and the connection is firmer.

REFERENCE NUMERALS

1. fixing plate; 10. securing plate; 11. connecting groove; 14. connecting chamber; 140. fixing groove; 15. flange nut; 2. connecting plate; 20. first sliding groove; 21. second sliding groove; 23. balance groove; 3. bidirectional screw; 30. limiting groove; 31. drive head; 4. first sliding block; 40. first sliding shaft; 41. balance rod; 5. second sliding block; 50. second sliding shaft; 6. first supporting rod; 60. first reinforcing rod; 61. first extension rod; 610. main extension plate; 611. side extension plate; 62. first rotation shaft; 63. first supporting foot; 64. foot shaft; 65. base plate; 66. side plate; 7. second supporting rod; 70. second reinforcing rod; 71. second extension rod; 73. second supporting foot; 8. rotating member; 81. first supporting shaft; 80. pivot column; 82. second supporting shaft; 90. supporting rod; 91. extension rod; 92. supporting foot; 93. limiting structure; 94. limiting member; 96. storage space.

DETAILED DESCRIPTION OF EMBODIMENTS

The following will be combined with the drawings of the embodiment to clearly and completely describe the technical scheme of the disclosure.

Embodiment 1

Figure 1:
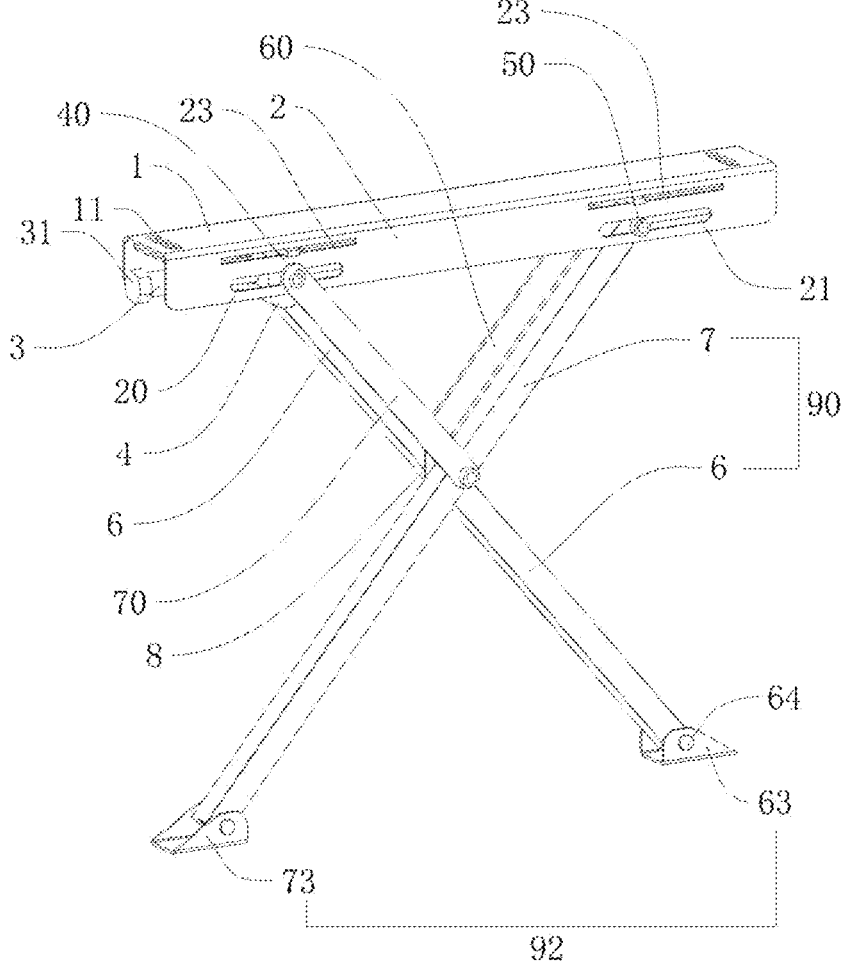
FIG. 1 illustrates an entire structure diagram of a vehicle step stabilizer of an embodiment 1.

A vehicle step stabilizer is provided. With reference to FIG. 1, the vehicle step stabilizer includes two supporting rods 90 rotatably connected to each other, a bidirectional screw 3 having two thread directions at two ends of the bidirectional screw, and a fixing plate 1. Two sides of the fixing plate 1 are bent downward to form two connecting plates 2. In other embodiments, the two connecting plates 2 and the fixing plate 1 can be fixed by welding.

In this embodiment, the two supporting rods 90 are a first supporting rod 6 and a second supporting rod 7. The first supporting rod 6 and the second supporting rod 7 are rotatably connected to each other at an intersection point of the two supporting rods. Tops of the two supporting rods 90 are configured to slide relative to a last step of a vehicle pedal.

Figure 2:
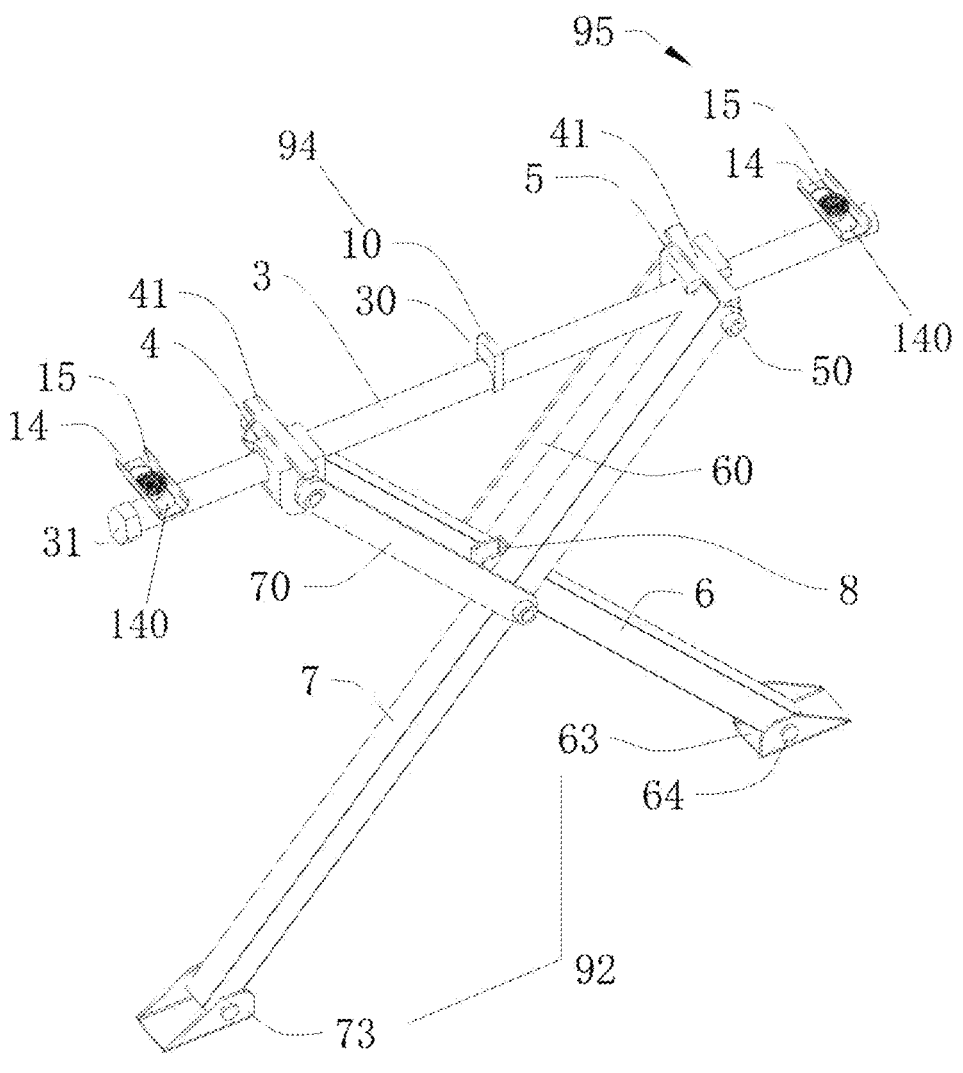
FIG. 2 illustrates a partial structure diagram of the vehicle step stabilizer of the embodiment 1.

Referring to FIG. 2, a limiting member 94 is disposed at a central portion between the two ends of the bidirectional screw 3. The bidirectional screw 3 is provided with a right-hand thread and a left-hand thread respectively on two sides of the limiting member 94, that is to say, the right-hand thread and the left-hand thread are respectively disposed on the two ends of the bidirectional screw. The limiting member 94 is configured to restrict a horizontal displacement of the bidirectional-screw 3, allowing the bidirectional screw 3 to rotate but not to translate.

In this embodiment, the limiting member 94 includes a securing plate 10 fixed on a bottom surface of the fixing plate 1. The bidirectional screw 3 is rotatably connected to the securing plate 10, and a connection area between the bidirectional screw 3 and the securing plate 10 is not threaded. A limiting groove 30 is recessed at the connection area between the bidirectional screw 3 and the securing plate 10. The securing plate 10 is rotatably connected to the bidirectional screw 3 at the limiting groove 30. The limiting groove 30 is configured to restrict a horizontal displacement of the securing plate 10, and enable the bidirectional screw 3 to rotate relative to the securing plate 10.

In some embodiments, the limiting member 94 may be a limiting ring protruding from a junction of the left-hand and right-hand threads on the bidirectional screw 3, and the fixing plate 10 is provided with a groove for the limiting ring to slide in.

In another embodiment, the fixing plate 1 defines a groove for the limit ring to slide therein.

In another embodiment, the limiting member 94 includes securing plates 10 or fixing rods extending downwardly, and the bidirectional screw 3 is rotatably connected to the fixing rods or the fixing plates.

In this embodiment, a first sliding block 4 is threadedly connected to one of the ends of the bidirectional screw 3, and a second sliding block 5 is threadedly connected to another end of the bidirectional screw 3. A top of the first supporting rod 6 is rotatably connected to the first sliding block 4, and a top of the second supporting rod 7 is rotatably connected to the first sliding block 5.

A first sliding shaft 40 extends outward from two opposite sides of the first sliding block 4, and a second sliding shaft 50 extends outward from two opposite sides of the second sliding block 5. The first supporting rod 6 is rotatably connected to the first sliding shaft 40, and the second supporting rod 7 is rotatably connected to the second sliding shaft 50. The first sliding block 4 and the second sliding block 5 are configured to move toward or away from each other, thereby moving tops of the first supporting rod 6 and the second supporting rod 7 closer together or farther apart accordingly.

Referring to FIG. 1, a first sliding groove 20 and a second sliding groove 21 are respectively defined at the positions of the two connecting plates 2 where the first sliding shaft 40 and the second sliding shaft 50 are disposed.

Two balance rods 41 (i.e., the first balance rod and the second balance rod) extend outward from two opposite sides of the first sliding block 4 and the two opposite sides of the second sliding block 5, respectively. Each of the two connecting plates 2 define two balance grooves 23 in parallel to the first sliding groove 20 and the second sliding groove 21. In this embodiment, the two balance rods 41 are disposed on tops of the first sliding block 4 and the second sliding block 5, and the two balance rods 41 extend outward from the two opposite sides of the first sliding block 4 and the two opposite sides of the second sliding block 5. In other embodiments, each balance rod 41 is disposed on two opposite sides of a corresponding sliding block 4 or 5, and extends outward from the two opposite sides of a corresponding sliding block 4 or 5. The balance grooves 23 are configured to enable the first sliding block 4 and the second sliding block 5 to slide more smoothly within the first sliding groove 20 and the second sliding groove 21, respectively, and to provide a more stable support structure. When the pedal is under load, the balance rods 41 are capable of sharing the load for the first sliding shaft 40 and the second sliding shaft 50.

Figure 3:
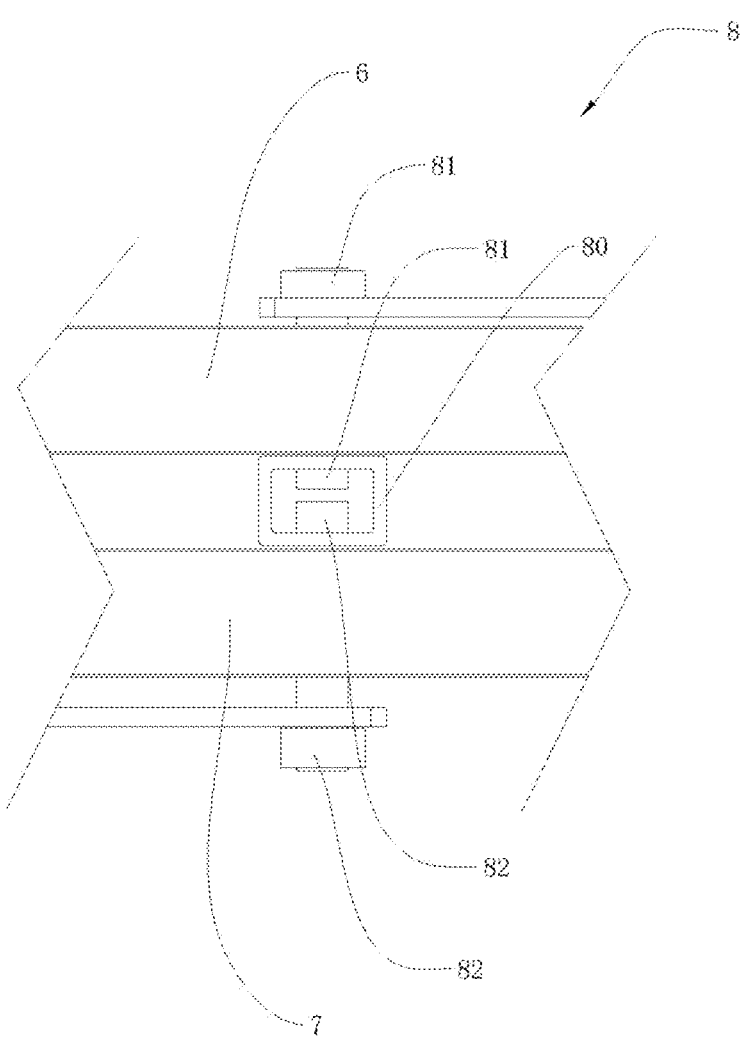
FIG. 3 illustrates a top view of a rotating member of the embodiment 1.

Referring to FIG. 3, a rotating member 8 is disposed at an intersection point between the first supporting rod 6 and the second supporting rod 7.

In this embodiment, the rotating member 8 includes a first supporting shaft 81, a second supporting shaft 82, and a pivot column 80.

An end of the first supporting shaft 81 is connected to the first supporting rod 6, and another end of the first supporting shaft 81 is rotatably connected to the pivot column 80. An end of the second supporting shaft 82 is connected to the second supporting rod 7, and another end is rotatably connected to the pivot column 80. The pivot column 80 is disposed between the first supporting rod 6 and the second supporting rod 7.

In this embodiment, the pivot column 80 is a hollow square steel with a square cross-section. A face of the hollow square steel is connected to the first supporting shaft 81, and an opposite face is connected to the second supporting shaft 82.

Referring to FIG. 1, FIG. 2 and FIG. 3, an end of the first supporting shaft 81 facing away from the pivot column 80 is rotatably connected to an end of a first reinforcing rod 60, and another end of the first reinforcing rod 60 is rotatably connected to the second sliding shaft 50. An end of the second supporting shaft facing away from the pivot column 80 is rotatably connected to an end of a second reinforcing rod 70, and another end of the second reinforcing rod 70 is rotatably connected to the first sliding shaft 40. The first reinforcing rod 60 and the second reinforcing rod 70 are configured to provide enhanced support stability and promotes more uniform load distribution of the vehicle step stabilizer. In a crossing process of the first supporting rod 6 and the second supporting rod 7, the dislocation will be formed due to the thicknesses of the supporting rods 90. The first supporting rod 6 and the second supporting rod 7 are not coplanar, resulting in unbalanced force. By setting the first reinforcing rod 60 and the second reinforcing rod 70, the unbalanced force is solved.

A drive head 31 is fixed to an end of the bidirectional-screw 3, and is configured for driving the rotation of the bidirectional screw 3. The rotation of the drive head 31 can be quickly adjusted by driving equipment such as electric drills. The drive head 31 in this embodiment is a hexagonal bolt head welded at the end of the bidirectional screw 3.

In some embodiments, the drive head 31 can be an octagonal bolt head, a square metal head with four corners or other shapes or structures capable of providing a grasping force for tools such as motors and electric drills. The drive head 31 can be an embedded flat-head nut, a slotted nut, or a concave prism-shaped groove. Any structure that can engage with and be driven by an electric drill or other driving equipment may serve as the drive head.

The electric drill drives the drive head 31 to rotate, and the drive head 31 drives the bidirectional screw 3 to rotate.

Because the bidirectional screw 3 has two thread directions at two ends of the bidirectional screw, the first sliding block 4 and the second sliding block 5 will move in directions opposite or move towards to each other, driving the tops of the first supporting rod 6 and the second supporting rod 7 to move toward or away from each other. The middle of each of the first supporting rod 6 and the second supporting rod 7 is limited by rotating connection through the pivot column 80, achieving the longitudinal height adjustment of the vehicle step stabilizer.

In this embodiment, referring to FIG. 1, two ends of the fixing plate 1 respectively define two connecting grooves 11, and a connecting chamber 14 is disposed on each fixing plate 1 and disposed at a side of a corresponding connecting groove 11 facing toward the supporting rods 90. A flange nut 15 is disposed in the connecting chamber 14. The flange nut 15 is slidably connected within the connecting chamber 14, to move along a length direction of the connecting groove 11.

A threaded hole is provided on or a nut is fixed thereto a bottom surface of the last step of the vehicle pedal. A screw is taken and is then threaded into the flange nut 15, passed through the flange nut 15, extended through the connecting groove 11, and finally threaded into the last pedal of the vehicle, thereby making the vehicle step stabilizer installed onto the vehicle pedal.

In an embodiment, a bottom surface of the connecting chamber 14 is provided with a fixing groove 140. A bolt is taken, and threaded into the fixing groove 140, connected to the hidden flange nut 15 and then passed through the hidden flange nut 15, and finally threaded into the last pedal of the vehicle, thereby making the vehicle step stabilizer installed onto the vehicle pedal.

In an embodiment, the flange nut 15 is embedded in the connecting chamber 14. A width of the connecting groove 11 is larger than a diameter of an inscribed circle of a hexagonal portion of the flange nut 15, and smaller than a diameter of a circumscribed circle of the hexagon of the flange nut 15, so that the flange nut 15 slides in the connecting groove 11, but cannot rotate.

A bolt is taken, and is connected to the flange nut 15, passed through the fixing plate 1, and passed through the connecting groove 11, and finally threaded into the last step of the vehicle pedal, thereby making the vehicle step stabilizer installed onto the vehicle pedal.

In this embodiment, a shape of each of the first supporting rod 6 and the second supporting rod 7 in this embodiment are supporting rods 90 each with a square cross-section.

Embodiment 2

Figure 4:
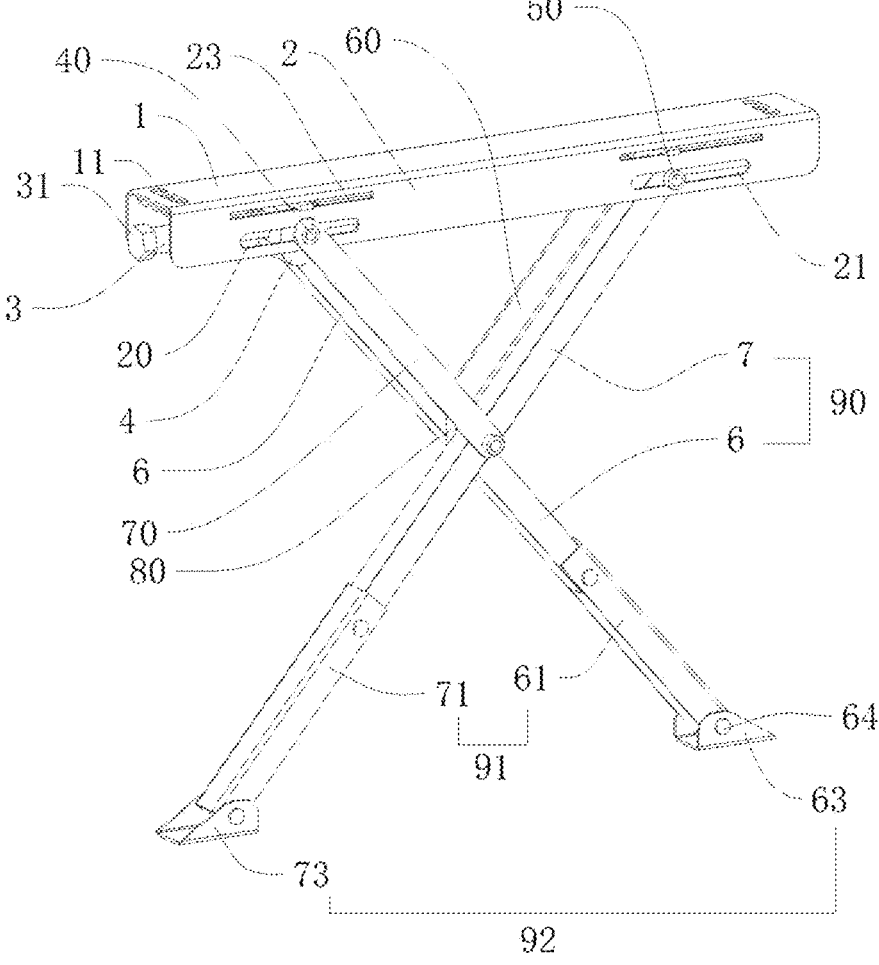
FIG. 4 illustrates an entire structure diagram of a vehicle step stabilizer of an embodiment 2.

Referring to FIG. 4, the difference between this embodiment and the embodiment 1 is that bottom ends of the first supporting rod 6 and the second supporting rod 7 are hinged with a first extension rod 61 and a second extension rod 71, respectively. When the first extension rod 61 is in an extended state, the first extension rod 61 is collinear with the first supporting rod 6. The first extension rod 61 and the second extension rod 71 are referred to as extension rods 91. The extension rods 91 allow for a greater adjustment range in an overall height of the supporting rods 90. When a ground height is similar to a height of the last pedal of the vehicle, the extension rods 91 are folded away, and only the supporting rods 90 are used for support. When an additional height is required, the extension rods 91 are unfolded and are used to support the vehicle step together with the supporting rods 90.

In this embodiment, the first supporting rod 6 and the second supporting rod 7 are hollow square tubes. The first extension rod 61 and the second extension rod 71 are both hollow extension rods 91 each with a U-shaped cross section, and each of the first extension rod 61 and the second extension rod 71 is formed by three integrally connected extension plates. A space enclosed by the three extension plates defines an accommodation space 96 for accommodating the supporting rods, facilitating easy storage.

Figure 5:
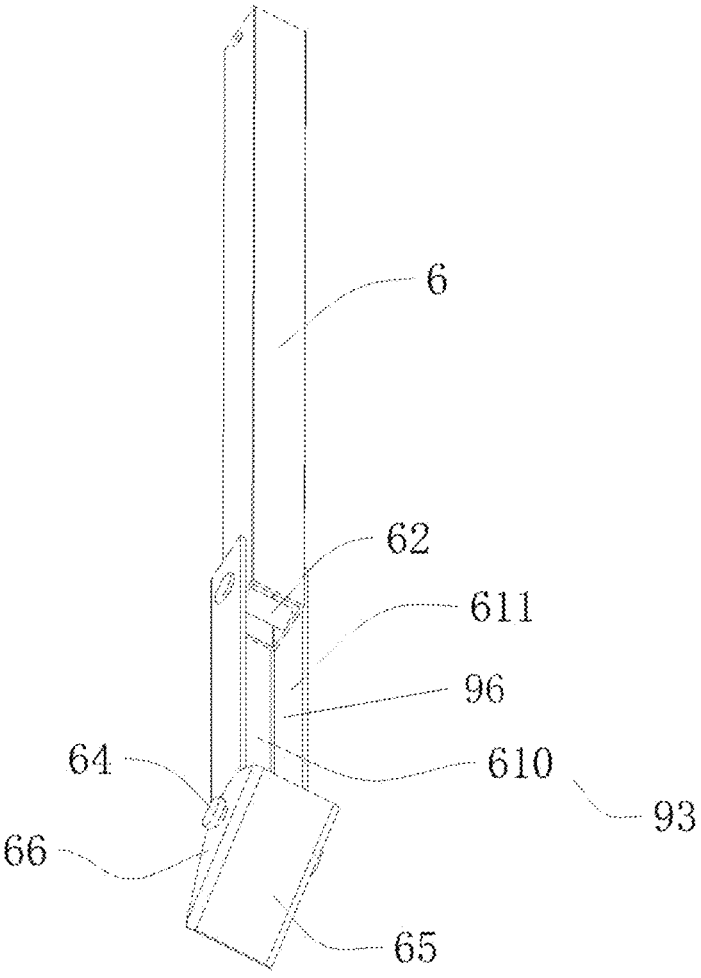
FIG. 5 illustrates a connection state diagram of a first supporting rod and a first extension rod in the embodiment 2.

Referring to FIG. 5, an outer extension plate of the three extension plates is a main extension plate 610. Two side extension plates 611 are formed by vertically extending two sides of the main extension plate 610.

The hinged connection between the first extension rod 61 and the first supporting rod 6 is that the bottom end of the first supporting rod 6 is covered by the three extension plates of the first extension rod 61. A first rotation shaft 62 is disposed to pass through one side extension plate 611, then pass through the first supporting rod 6, and finally pass through the other side extension plate 611. The main extension plate 610 is attached to an outer surface of the bottom end of the first supporting rod, thereby preventing the extension rods 91 from rotating outward beyond a preset position. In this embodiment, in the preset position, the first extension rod 61 is collinear with the first supporting rod 6, and the second extension rod 71 is collinear with the second supporting rod 7.

The second extension rod 71 has the same structure with the first extension rod 61, and is hinged with the second supporting rod 7 at the bottom end of the second supporting rod 7. The hinging method is the same with that on the first extension rod 61.

Bottom ends of the first extension rod 61 and the second extension rod 71 are respectively provided with a first supporting foot 63 and a second supporting foot 73. The first supporting foot 63 and the second supporting foot 73 are collectively referred to as a supporting foot 92.

The first supporting foot 63 and the second supporting foot 73 have the same structure and are symmetrically oriented. This embodiment is introduced with the first supporting foot 63.

The first supporting foot 63 includes a base plate 65, two side plates 66 vertically fixed on two sides of the base plate 65, and a foot shaft 64. The foot shaft 64 is disposed to pass through one side plate 66, then pass through the first extension rod 61, and then pass through the other one side plate 66, thereby providing a rotational connection for the supporting foot 92 and the extension rod 91.

When the supporting foot 92 is rotated to a position where the supporting foot 92 is in parallel with the extension rod 91, the base plate 65 faces an inner side of each of the two extension rods 91. When the vehicle step stabilizer is in a using state, the base plate 65 is in contact with the ground to provide support and increases a contact area between the vehicle step stabilizer and the ground.

Figure 6:
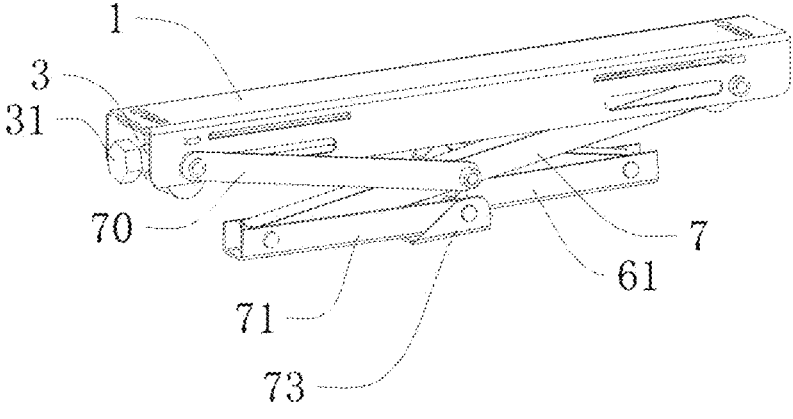
FIG. 6 illustrates a schematic folding state vies of the vehicle step stabilizer of the embodiment 2.

Referring to FIG. 6, FIG. 6 illustrates a schematic folding state vies of the vehicle step stabilizer. The rotation of the bidirectional screw 3 drives the tops of the first supporting rod 6 and the second supporting rod 7 to move away from each other, so that the top of the first supporting rod 6 and the bottom of the second supporting rod 7 move to each other. As a result, the first supporting rod 6 and the first extension rod 61 rotate inward to fold, and the second supporting rod 7 and the second extension rod 71 also rotate inward to fold. The first supporting foot 63 and the second supporting foot 73 rotate outward and then fold accordingly.

Specifically, when the vehicle step stabilizer is in the non-working state, the supporting bracket is fixed on the last step of the vehicle pedal by the flange nut 15. When the vehicle step stabilizer needs to be used, after the vehicle pedal is unfolded, the electric drill is used to drive the drive head 31 to rotate the bidirectional screw 3. Since the bidirectional-screw 3 has two thread directions at two ends of the bidirectional screw, each of the first sliding block 4 and the second sliding block 5 is slidably connected with the bidirectional screw 3, so that the first sliding block 4 and the second sliding block 5 are closer together or farther apart accordingly along the length of the bidirectional screw 3. In order to make the first sliding block 4 and the second sliding block 5 not rotate in the working state, the connecting plate 2 defines the first sliding groove 20 and the second sliding groove 21. The first sliding shaft 40 extends outward from two opposite sides of the first sliding block 4, and the second sliding shaft 50 extends outward from two opposite sides of the second sliding block 5. The first sliding block 4 and the second block 5 respectively slide within the first sliding groove 20 and the second sliding groove 21, so that the rotation of the first sliding block 4 and the second sliding block 5 is limited.

In the process of the first sliding block 4 and the second sliding block 5 moving closer together or far apart from each other, the top of each of the first supporting rod 6 and the second supporting rod 7 is moved to get closer together or far apart from each other, and the longitudinal height of the vehicle step stabilizer can be adjusted with the cooperation of the rotating member 8, The setting of the extension rods 91 enables the vehicle step stabilizer to be folded and stored in the non-working state, as well as a height adjustment stroke, and creates an accommodation space for accommodating the supporting rods, facilitating easy storage.

Although the disclosure has been described in detail with reference to the aforementioned embodiments, for those skilled in the art to make a variety of changes, modifications, replacements and variants to the technical solutions described in the aforementioned embodiments without deviating from the principle of the disclosure. The scope of the disclosure is limited by the attached claims and its equivalents.

What is claimed is:

1. A vehicle step stabilizer, comprising:

two supporting rods, wherein the two supporting rods are rotatably connected to each other, and are configured for connecting to a last step of a vehicle pedal;

a bidirectional screw, having two thread directions at two ends of the bidirectional screw; and a first sliding block and a second sliding block, respectively threadedly connected to the two ends of the bidirectional screw;

wherein the two supporting rods are rotatably connected to the first sliding block and the second sliding block, respectively; and the first sliding block and the second sliding block are configured to move toward or away from each other on the bidirectional screw, thereby moving tops of the two supporting rods closer together or farther apart accordingly;

wherein the vehicle step stabilizer further comprises: a fixing plate, configured for fixing on the last step of the vehicle pedal; and two connecting plates, which are vertically fixed on two sides of the fixing plate respectively;

wherein each of the first sliding block and the second sliding block is slidably connected to the two connecting plates, wherein a first sliding shaft extends outward from two opposite sides of the first sliding block, and a second sliding shaft extends outward from two opposite sides of the second sliding block; each of the two connecting plates is defined with a first sliding groove and a second sliding groove for sliding operations of the first sliding shaft and the second sliding shaft respectively; and the two supporting rods are rotatably connected to the first sliding shaft and the second sliding shaft, respectively; and wherein a first balance rod extends outward from the two opposite sides of the first sliding block, a second balance rod extends outward from the two opposite sides of the second sliding block, the two connecting plates define two balance grooves to correspond to the first balance rod and the second balance rod, the first and second balance rods are slidably respectively engaged within the two balance grooves, and the two balance grooves are disposed parallel to the first sliding groove and the second sliding groove.

2. The vehicle step stabilizer as claimed in claim 1, wherein a bottom surface of the fixing plate is provided with a limiting member for limiting horizontal displacement of the bidirectional screw.

3. The vehicle step stabilizer as claimed in claim 2, wherein the limiting member comprises a securing plate vertically fixed on the bottom surface of the fixing plate; the securing plate is rotatably connected to a demarcation point of the two ends of the bidirectional screw; and the bidirectional screw defines a limiting groove used to limit the horizontal displacement of the bidirectional screw in cooperation with the securing plate.

4. The vehicle step stabilizer as claimed in claim 1, wherein a drive head is fixed to an end of the bidirectional screw, and is configured for driving the rotation of the bidirectional screw.

5. The vehicle step stabilizer as claimed in claim 4, wherein the two supporting rods are a first supporting rod and a second supporting rod; a rotating member is disposed at an intersection point of the two supporting rods; a side of the rotating member near the first supporting rod is rotatably connected to an end of a first reinforcing rod; another end of the first reinforcing rod is rotatably connected to the second sliding block; a side of the second supporting rod is rotatably connected to an end of a second reinforcing rod; and another end of the second reinforcing rod is rotatably connected to the first sliding block.

6. The vehicle step stabilizer as claimed in claim 5, wherein a bottom end of each of the first supporting rod and the second supporting rod is hinged with an extension rod; an outer side of the extension rod is provided with a limiting structure for limiting the excessive rotation of the extension rod; the limiting structure is configured to prevent the extension rod from rotating outward beyond a preset position; and each extension rod has an accommodation space for accommodating a corresponding one of the first and second supporting rods.

7. The vehicle step stabilizer as claimed in claim 6, wherein the fixing plate defines a connecting groove; a connecting chamber is disposed on the fixing plate and disposed at a bottom of the connecting groove; a flange nut is disposed in the connecting chamber; a width of the connecting chamber is larger than a diameter of an inscribed circle of a hexagonal portion of the flange nut, and smaller than a diameter of a circumscribed circle of the hexagon of the flange nut.

8. A vehicle step stabilizer, comprising:

two supporting rods, wherein the two supporting rods are rotatably connected to each other, and are configured for connecting to a last step of a vehicle pedal;

a bidirectional screw, having two thread directions at two ends of the bidirectional screw; and a first sliding block and a second sliding block, respectively threadedly connected to the two ends of the bidirectional screw;

wherein the two supporting rods are rotatably connected to the first sliding block and the second sliding block, respectively; and the first sliding block and the second sliding block are configured to move toward or away from each other on the bidirectional screw, thereby moving tops of the two supporting rods closer together or farther apart accordingly; and wherein the two supporting rods are a first supporting rod and a second supporting rod; a rotating member is disposed at an intersection point of the two supporting rods; a side of the rotating member near the first supporting rod is rotatably connected to an end of a first reinforcing rod; another end of the first reinforcing rod is rotatably connected to the second sliding block; a side of the second supporting rod is rotatably connected to an end of a second reinforcing rod; and another end of the second reinforcing rod is rotatably connected to the first sliding block.

* * * * *